United States Patent [19]

Simone

[11] Patent Number: 4,997,374
[45] Date of Patent: Mar. 5, 1991

[54] TEACHING DEVICE

[76] Inventor: John A. Simone, 31 Rustic Acres Dr., Chepachet, R.I. 02814

[21] Appl. No.: 354,119

[22] Filed: May 19, 1989

[51] Int. Cl.⁵ .............................................. G09B 5/00
[52] U.S. Cl. .................................... 434/317; 434/178; 434/327; 434/335
[58] Field of Search ............... 434/167, 178, 308, 309, 434/317, 319, 322, 327, 335, 48, 30, 219, 227, 153; 84/470 R

[56] References Cited

U.S. PATENT DOCUMENTS

| | | | |
|---|---|---|---|
| 2,442,447 | 6/1948 | Zadig | 434/308 X |
| 3,377,716 | 4/1968 | Schmoyer | 434/308 X |
| 3,641,684 | 2/1972 | Paige | 434/317 |
| 3,738,021 | 6/1973 | Hino et al. | 434/317 |
| 4,079,431 | 3/1978 | Marut | 434/308 X |
| 4,189,852 | 2/1980 | Chatlien | 434/178 |
| 4,416,182 | 11/1983 | Wise et al. | 84/470 R |
| 4,449,941 | 5/1984 | McGuire | 434/153 |
| 4,884,974 | 12/1989 | DeSmet | 434/317 |

Primary Examiner—Richard J. Apley
Assistant Examiner—Jennifer L. Doyle
Attorney, Agent, or Firm—Salter & Michaelson

[57] ABSTRACT

A teaching device includes a changeable two channel prerecorded program source, and a console unit including a work booklet. The first channel of the program source includes an audio program comprising a series of spoken words which are audibly reproduced by the console unit and the second channel includes a series of control signals which are operative for actuating lights adjacent prespecified words in the work booklet. The operation of the console unit is coordinated with the audio program so that lights are actuated adjacent to the words in the work booklet as the same words are audibly reproduced by the console unit. One embodiment of the device further includes a plurality of depressible user response buttons on the console unit for indicating responses to questions presented in the audio program.

11 Claims, 3 Drawing Sheets

TEACHING DEVICE

BACKGROUND AND SUMMARY OF THE INVENTION

The instant invention relates to teaching aids and more particularly to a teaching device for assisting a child in learning to read.

It has generally been found that it is important for children to develop word recognition skills in the early stages of learning to read. In this regard, traditionally, parents have assisted their children in developing word recognition skills by reading to them out loud while simultaneously pointing to the corresponding written words as they are spoken. It has been found that this technique can be effectively utilized for assisting children in the development of word recognition skills through repeated exposure and that it can also provide an effective source of rewarding interaction between children and their parents. Unfortunately, however, it has also been found that the demands of modern society often limit the amounts of time which parents can devote to their children in activities of this type and that as a result many children are slow to develop proper word recognition skills.

The instant invention provides an effective teaching device which is operative for assisting children in the development of word recognition skills as well as various other learning skills. Specifically, the instant invention provides a teaching device which is operative for audibly reproducing prerecorded sequences of words as lights are illuminated adjacent to the same words on the pages of a booklet. Still more specifically, the teaching device of the instant invention comprises means for simultaneously reproducing first and second prerecorded signals wherein the first signal includes an audio program comprising a series of spoken words and the second signal includes a series of control signals which are time coordinated with the spoken words in the first signal. The teaching device further comprises means responsive to the first signal for audibly reproducing the audio program and a base having a plurality of individually actuatable visual signal elements thereon. The device still further comprises indicia means adjacent to at least a portion of the signal elements on the base which correspond to the spoken words in the audio program and means responsive to the control signals for actuating predetermined visual signal elements so that the indicia means corresponding to the visual signal elements which are actuated at any given time correspond to the spoken words reproduced in the audio program at the same time. Accordingly, when the indicia means comprises the same words as the words reproduced in the audio program and the visual signal elements comprise individually actuatable lights, the lights next to specific words in the indicia means are illuminated as the same words are audibly reproduced in the audio program. As a result, the teaching device can be effectively utilized for developing word recognition skills by providing an effective means for simultaneously audibly reproducing words while signal elements on the base are illuminated adjacent to the same words. Further, it will be understood that the device of the subject invention can also be adapted for audibly reproducing various other sounds so that it can be utilized in the development of various other sound recognition skills including foreign language skills.

In the preferred embodiment of the teaching device of the instant invention the signal elements comprise individually actuatable LEDs which are located adjacent to their corresponding indicia means on the base. The indicia means preferably comprises a series of written words which are the same as the words in the audio program. Further, in the preferred embodiment the visual signal elements are actuated so that the signal elements adjacent to the written words are illuminated as the same words are reproduced in the audio program. The signal elements are preferably disposed in a series on horizontal rows and the written words are preferably disposed adjacent to the signal elements in the horizontal rows on the base. Further, the teaching device is preferably operable so that as the spoken words are reproduced in the audio program the signal elements on the base are correspondingly advanced along in the rows to indicate the written forms of the same words. Still further, each of the signal elements is preferably actuated after the preceding signal element has been deactuated. The indicia means on the base preferably comprises a plurality of changeable pages each having a plurality of indicia or words thereon which are coordinated with the spoken words in the first signal. The changeable pages preferably each have a plurality of apertures therein and the visual signal elements are preferably visible through the apertures in the pages to enable them to indicate words on the pages which correspond to the words reproduced in the audio program at any given time.

In the preferred embodiment, the teaching device of the instant invention is also adapted to enable an operator to respond to questions which ar presented in the audio program. In particular, the device is adapted so that it includes manually actuatable response means, preferably comprising a plurality of response buttons which are manually depressible for producing generated response signals which are responsive to the first audio program. Further, the control signals preferably comprises correct response signals which represent correct responses to the audio program and the device preferably further comprises means for comparing the generated response signals with the correct response signals and for indicating the results to the operator of the device. Further, the device can also be adapted to maintain a running score of the user's correct and incorrect responses and to provide a total score, such as by instructing a user to turn to a prespecified score page of the indicia means and illuminating an LED corresponding to the appropriate score location on the score page.

Devices representing the closes prior art to the subject invention of which the applicant is aware are disclosed in the U.S. Pat. No. 2,369,572 to KALLMAN; U.S. Pat. No. 2,524,143 to SMITH; U.S. Pat. No. 3,220,126 to GABRIELSEN; U.S. Pat. No. 3,583,729 to DE GROOT; U.S. Pat. No. 3,598,927 to BECKER; U.S. Pat. No. 3,641,684 to PAIGE; U.S. Pat. No. 3,968,576 to TAYLOR; U.S. Pat. No. 4,189,852 to CHATLIEN; U.S. Pat. No. 4,273,538 to ROSS; U.S. Pat. No. 4,308,017 to LAUGHON et al.; U.S. Pat. No. 4,406,626 to ANDERSON et al.; U.S. Pat. No. 4,636,881 to BREFKA et al.; U.S. Pat. No. 4,703,573 to MONTGOMERY et al.; and U.S. Pat. No. 4,752,230 to SHIMIZU. However, while these references disclose a variety of teaching devices including electronic books which are adapted to be connected to tape playing apparatus, they fail to suggest many of the concepts and features of the teaching device of the instant invention.

In particular, they fail to suggest the concept of coordinating prerecorded spoken words in an audio program with written words in a booklet through the use of control signals which are time coordinated with the audio program. They also fail to suggest the concept of providing a series of actuatable LEDs which are advanced across the pages of a booklet to highlight prespecified words as the same words are audibly reproduced.

Accordingly, it is a primary object on the instant invention to provide an effective teaching device for aiding children in the development of word recognition skills.

Another object of the instant invention is to provide an effective teaching device wherein words are audibly reproduced and wherein LEDs are advanced across the pages of a booklet in order to highlight the same words on the pages.

An even further object of the instant invention is to provide a effective teaching device for aiding in the development of word recognition skills which is adapted to also permit an operator to respond to questions in an audio program.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
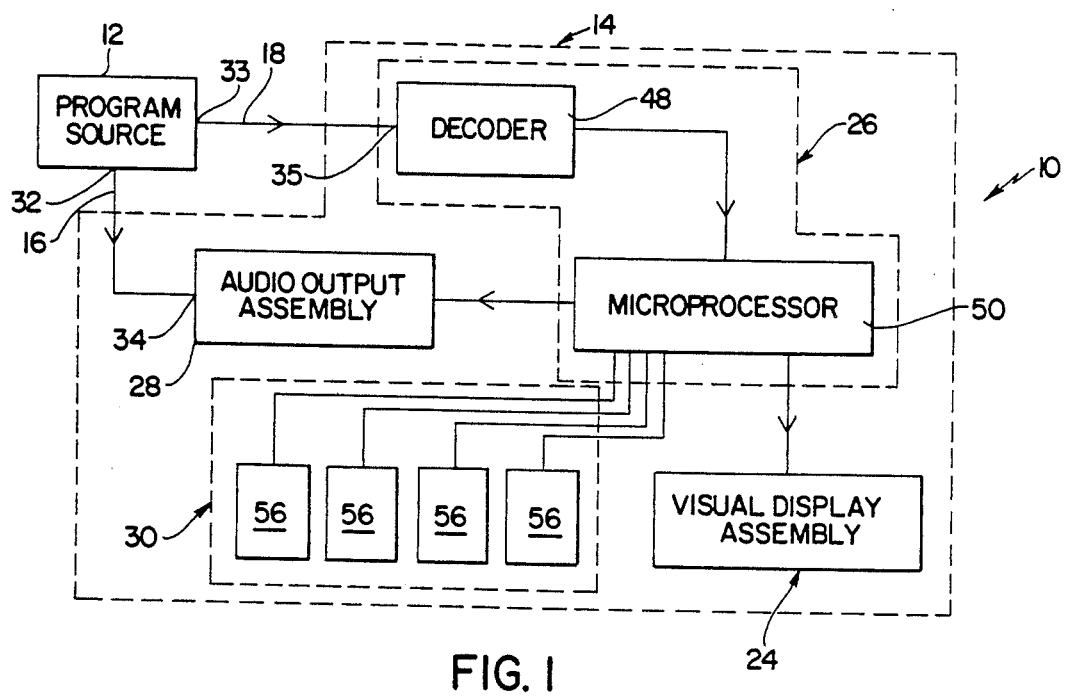
FIG. 1 is a block diagram of the teaching device of the instant invention.
Figure 2:
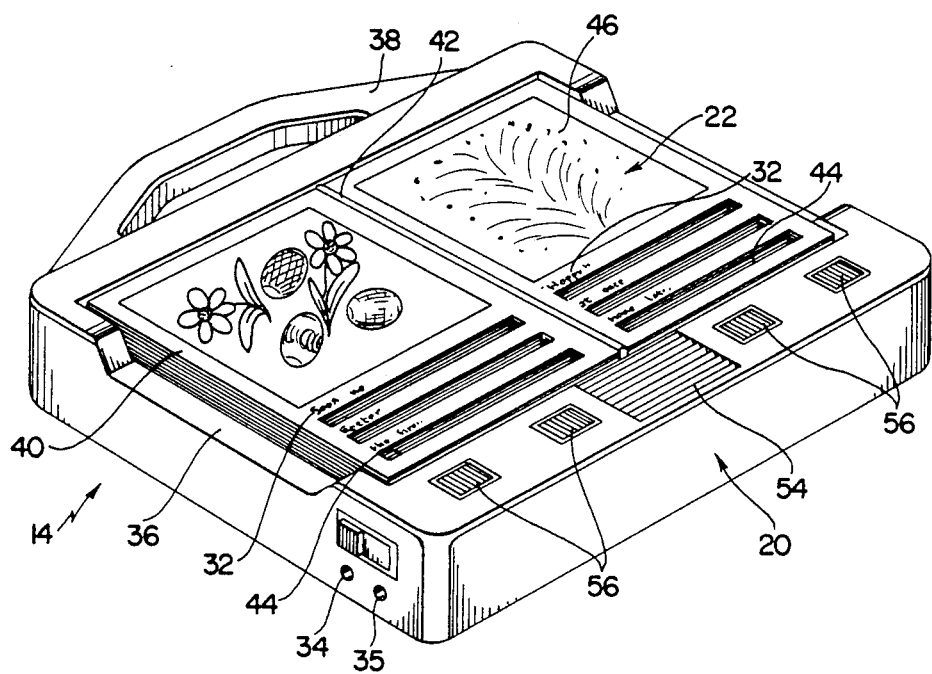
FIG. 2 is a perspective view of the console portion of the teaching device.
Figure 3:
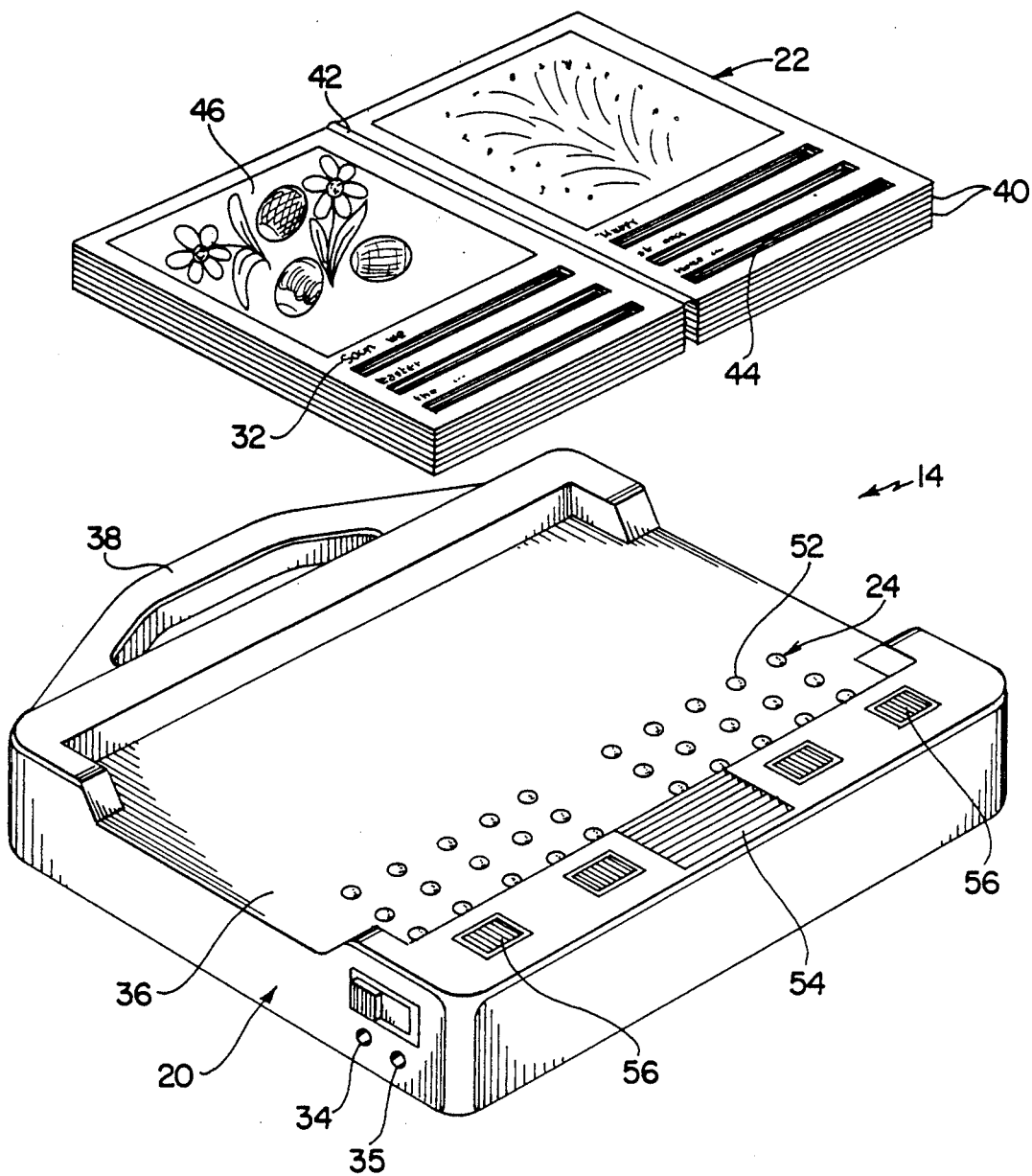
FIG. 3 is an exploded perspective view thereof.
Figure 4:
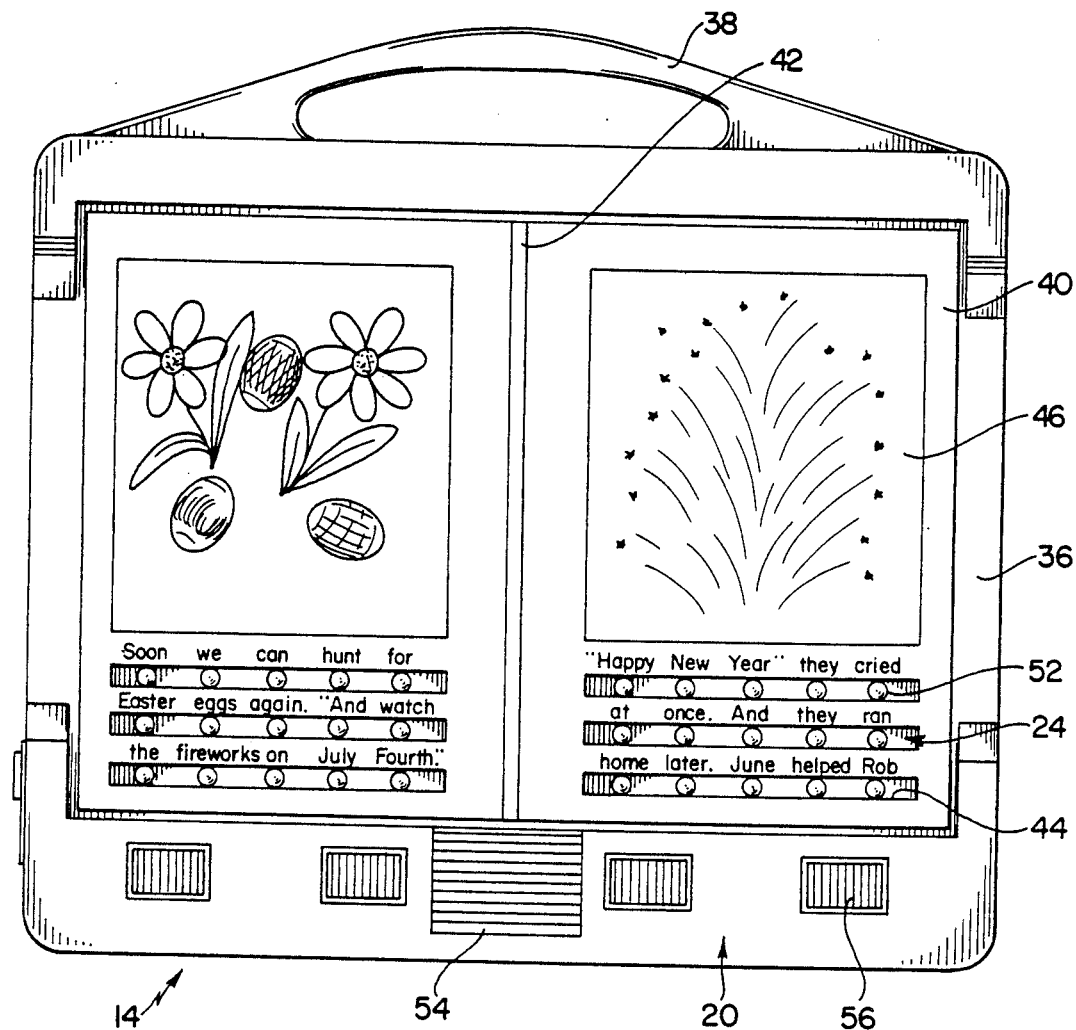
FIG. 4 is a top plan view thereof.

Referring now to the drawings, the teaching device of the instant invention is schematically illustrated and generally indicated at 10 in FIG. 1. The teaching device 10 comprises a prerecorded program source 12 illustrated in FIG. 1 and a console unit generally indicated at 14 in FIGS. 1-4. The prerecorded program source 12 is operative for generating a first prerecorded signal 16 including an audio program comprising a series of spoken words and a second prerecorded signal 18 including a series of control signals which are time coordinated with spoken words in the first prerecorded signal 16. The console unit 14 comprises a base generally indicated at 20, a work booklet generally indicated at 22 on the base 20 and a visual display assembly 24, a control assembly generally indicated at 26, an audio output assembly 28 and a user response assembly 30, all of which are mounted in the base 20. The work booklet 22 has a series of written words 32 on the pages thereof which are preferably identical to the spoken words in the first audio program and the work booklet 22 is received on the base 20 so that the written words 32 on the pages thereof are positioned adjacent to the visual display assembly 24. The control assembly 26 is operative in response to the control signals in the second prerecorded signal 18 for controlling the visual display assembly 24 so that portions of the display assembly 24 are illuminated to designate or highlight specific words 32 in the booklet 22 which correspond to the spoken words in the audio program. Accordingly, visual indications of the spoken words in the audio program are provided in the booklet 22 on the base 20 as the same words are audibly reproduced from the audio output assembly 28.

The prerecorded audio program source 12 preferably comprises a conventional two channel stereophonic cassette tape player containing a prerecorded magnetic cassette tape, although it can alternatively be adapted to include various other two channel program sources, such as a VCR, etc. The audio program source 12 includes first and second audio output terminals 32 and 33, respectively which are preferably adapted to be connected to a conventional amplification or playback unit through shielded cables or the like. As illustrated in FIG. 1, the first and second terminals 32 and 33 are electrically connected to first and second terminals 34 and 35, respectively, on the console unit 14 for transmitting the first and second prerecorded signals 16 and 18, respectively, thereto. The magnetic cassette tape in the audio program source 12 preferably comprises a two channel prerecorded cassette tape, wherein the first channel comprises the first signal 16 including a recorded audio program which is reproducible as a predetermined series of spoken words or phrases and/or various questions and other sounds. The second channel on the cassette tape includes the second signal 18 which comprises a series of coded binary digital control signals or pulses for coordinating the operation of the display assembly 24 with the spoken words in the first prerecorded signal 16. In this regard, the second prerecorded signal preferably includes a plurality of groups or sets of digital signals which, in the embodiment herein set forth, each include two start bits, eight data bits and one parity bit. The start bits of each set of control signals are operative for providing a signal to the control assembly 26 that data is about to be transmitted in the second prerecorded signal 18 and five of the data bits provide up to 32 binary addresses which correspond to the words in the first prerecorded signal 16 and represent address locations in the display assembly 24. When the device 10 is operated in a question mode rather than a reading mode two of the data bits of each set also provide up to four addresses which correspond to specific response buttons in the user response assembly 30. The remaining data bit represents a control signal which controls whether the device 10 is operated in a reading mode or a question mode. The parity bit provides a simple check on the data transmitted in a given set of signals by providing a basis for comparison as to whether the total number of data bits transmitted in the set is odd or even.

The base 20 preferably comprises a housing made of a suitable material, such as a plastic and it is preferably adapted to be received on a supporting surface. The base 20 is operative for housing the visual display assembly 24, the control assembly 26, the audio output assembly 28, and the user response assembly 30 and it includes an open tray portion 36 illustrated in FIG. 3 which is adapted for receiving the work booklet 22 thereon, and a carrying handle 38.

The work booklet 22 preferably comprises a plurality of pages 40 which are connected through a binding 42 so that they can be turned in a manner similar to the pages of a conventional book. Each of the pages 40 has a plurality of apertures or elongated slots 44 therein and the booklet 22 is dimensioned so that when it is received on the tray portion 36 of the base 20 the slots 44 are aligned with predetermined portions of the visual display assembly 24. Each of the pages 40 preferably has a series of the words 32 thereon which are positioned above the slots 44. Each of the pages 40 preferably also includes a design or picture 46 which corresponds to the written words 32 thereon.

As illustrated in FIG. 1, the control assembly 26 comprises a decoder 48 and a microprocessor 50. The decoder 48 preferably comprises a decoder, such as an LM 567 tone decoder manufactured by National Semiconductor Corporation and it is operative for converting the digital frequency tone signals in the second prerecorded signal 18 to digital signals which can be received and processed by the microprocessor 50. Alternatively, other types of decoders, such as operational amplifiers which are connected as noise detectors can be used in the control assembly 26. The microprocessor 50 comprises a conventional microprocessor, such as an NEC UPD 7506 four bit single chip CMOS microcomputer and it is operative for processing the signals from the decoder 48 in order to control the operation of the visual display assembly 24 and the user response assembly 30 as well as for generating audio signals which are sent to audio output assembly 28. Specifically, the microprocessor 50 is responsive to the digital data bit signals from the decoder 48 for actuating prespecified areas of the visual display assembly 24 which correspond to the addresses specified in the data bit signals. Further, when the control signals from the decoder 48 indicate that a question has been asked in the first prerecorded signal 16, the microprocessor 50 is operative for receiving signals from the user response assembly 30 and for determining whether or not they correctly correspond to the answer codes in the data bit signals received from the decoder 48. The microprocessor 50 is further operative for generating correct and incorrect audio sound signals depending on whether a correct answer or an incorrect answer has been selected on the user response assembly 30. The correct or incorrect audio signals generated by microprocessor 50 are sent to the audio output 28 where they are converted into audible sounds. In any event, it will be understood that microprocessor 50 is programmable through conventional programming techniques for performing the functions herein described and that it could alternatively be programmed to perform various additional functions in order to incorporate additional features in the teaching device 10.

The visual display assembly 24 comprises a plurality of LEDs 52 which are disposed in substantially aligned rows in the tray portion 36 as illustrated. The LEDs 52 are oriented on the base 20 so that when the booklet 22 is received on the tray portion 36 the LEDs 52 are aligned with the slots 44 therein. Further, the words 32 on the pages 40 and the LEDs 52 are preferably oriented so that each LED 52 is positioned adjacent a specific word 32 on each of the exposed or visible pages 40. Accordingly, by illuminating a specific LED 52 it is possible to indicate or designate a specific word 32 on an exposed page 40. The LEDs 52 are individually connected to the microprocessor 50 so that they are individually actuatable by the microprocessor 50 in response to the data bit signals from the decoder 48.

The audio output assembly 28 comprises a conventional audio amplifier, such as an LM 386 0.5 watt amplifier manufactured by National Semiconductor Corporation and a conventional audio speaker connected to the audio amplifier. The audio output assembly 28 is mounted in the base 20 so that the speaker thereof is positioned behind a grill 54 on the base 20. The audio output assembly 28 is operative for receiving the first prerecorded signals 16 from the audio program source 12 and for amplifying and audibly reproducing the first audio program. The audio output assembly 28 is further operative for receiving correct or incorrect answer signals from the microprocessor 50 and for audibly reproducing these signals as correct or incorrect answer sounds.

The user response assembly 30 comprises a plurality of depressible buttons 56 which are mounted on the base 20. The buttons 56 are operatively connected to the microprocessor 50 so that the microprocessor 50 can electrically sense whether one of the four buttons 56 has been depressed at any given time and if so, which one. In this regard, the answer buttons 56 are preferably color coded or otherwise marked so that they correspond to prespecified indicia or other markings on the pages 40 to enable the buttons 56 to be utilized for selecting answers based on their association with the indicia or other markings on the pages. The microprocessor 50 is preferably programmed to scan the answer buttons 56 to see if one of the answer buttons 56 has been depressed within a predetermined time interval following a question in the first prerecorded sound signal 16. Further, the microprocessor 50 is programmed so that in the event that one of the answer buttons 56 has been depressed the microprocessor 50 operates to compare the answer signal thereby generated with the digital data bit information corresponding to the correct answer from the decoder 48 in order to determine whether or not the correct answer button 56 has been depressed. In the event that the correct answer button 56 has been depressed the microprocessor 50 is operative for generating a correct answer signal and for transmitting this signal to the audio output 28. Alternatively, in the event that an incorrect answer button 56 has been depressed the microprocessor 50 is operative for generating an incorrect answer signal which is sent to the audio output 28 so that an incorrect answer sound is generated by the audio output 28.

Accordingly, during use and operation of the device 10 the audio program source 12 is operative for generating a first prerecorded signal 16 comprising a plurality of recorded words and a second prerecorded signal 18 comprising a plurality of control signals. The recorded words in the first prerecorded signal 16 are forwarded to the audio output 28 where they are amplified and played through the speaker portion of the audio output 28. The control signals in the second prerecorded signal 18 are forwarded to the decoder 48 where they are transformed into a digital format which is compatible with the microprocessor 50. The signals from the decoder 48 are fed to the microprocessor 50 so that the microprocessor 50 can determine whether or not the first prerecorded signal 16 contains a question requiring a user response. In the event that the first prerecorded signal does not include a question, the console unit 14 is operated in a reading mode wherein the microprocessor 50 operates to actuate the LEDs 52 which are adjacent the words 32 in the work booklet 22 as the same words are audibly reproduced by the audio output assembly 28. On the other hand, when the first prerecorded signal 16 contains a question, the console unit 14 is operated in a question and answer mode and the second prerecorded signal 18 provides corresponding control data bit signals to the decoder 48 which are passed to the microprocessor 50 to indicate that a question has been asked. Further, the second prerecorded signal 18 supplies data bit control signals to the decoder 48 which specify the correct answer to the question asked and corresponding signals are sent to the microprocessor 50. The microprocessor 50 preferably then provides a delay of approximately four seconds during which it scans the operator response buttons 56 to see if one of the response buttons 56 has been depressed and if so, whether or not the selected answer button 56 corresponds to the correct answer. In the event that the correct answer button 56 has been depressed, the microprocessor 50 is operative for generating a correct answer signal which is fed to the audio output where it is reproduced as an audible correct answer sound signal. In the event that an incorrect answer button 56 has been depressed, the microprocessor 50 is operative for generating an incorrect answer signal which is reproduced by the audio output 28 as an incorrect audible sound signal. The microprocessor 50 is preferably also operative for selectively interrupting the audio output assembly 28 in response to correct or incorrect answers selected on the answer buttons 56 so that appropriate portions of the recorded word combinations in the audio program can be deleted in order to adapt the word combinations in the audio program to indicate whether a correct or an incorrect answer has been selected.

It is seen therefore that the instant invention provides an effective teaching device. The device 10 is operative for audibly reproducing spoken words while simultaneously illuminating indicator lights adjacent to the same words as they appear in written format on the pages of a work booklet. Accordingly, the device 10 can be effectively utilized for enhancing and developing early word recognition skills. Further, the device 10 is operative for verbally presenting various questions to a user and for providing a means for the user to respond to the questions. Still further, the device 10 is operative for determining whether or not the user has chosen the correct response to a question and for providing an audible indication of whether or not the response is correct or incorrect. Accordingly, for these reasons as well as the other reasons hereinabove set forth it is seen that the teaching device of the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A teaching device comprising;
    a. means for reproducing first and second prerecorded signals, said first signal including an audio program comprising a series of spoken words, said second signal including a series of control signals which are time coordinated with the spoken words in said first prerecorded signal;
    b. means responsive to said first signal for audibly reproducing said audio program;
    c. a base;
    d. a plurality of individually actuatable visual signal elements disposed in a series of horizontal rows on said base;
    e. indicia means on said base corresponding to at least a portion of said signal elements, said indicia means comprising written of said signal elements, said indicia means comprising written words which are disposed in rows adjacent said visual signal elements, said written words being in the same order on said base as the spoken words in said audio program; and
    f. means responsive to said control signals for actuating predetermined visual signal elements on said base so that the visual signal element corresponding to each written word is actuated as the same word is presented in said audio program.

2. In the teaching device of claim 1, said visual signal elements being individually illuminatable for visually signalling an operator of said teaching device.

3. In the teaching device of claim 1, said means responsive to said control signals deactuating said visual signal elements so that the visual signal element corresponding to each written word is deactuated before the next spoken word is presented in said audio program.

4. The teaching device of claim 1, further comprising manually actuatable response means for producing generated response signals which are responsive to the spoken words in said audio program, said second signal comprising a plurality of correct response signals which represent correct responses to said audio program, and means for comparing the generated response signals with the correct response signals and for indicating the result to an operator of said device.

5. In the teaching device of claim 1, said means for reproducing first and second prerecorded signals comprising a magnetic tape audio cassette having first and second channels, said audio program being recorded on said first channel, said control signals being recorded on said second channel.

6. In the teaching device of claim 1, said visual signal elements comprising LEDs.

7. In the teaching device of claim 4, said means manually actuatable comprising a series of depressible response buttons on said base.

8. In the teaching device of claim 1, said indicia means comprising at least one changeable page on said base, said page having said written words thereon, said written words being coordinated with the spoken words in said audio program.

9. In the teaching device of claim 8, said page having at least one aperture therein, said visual signal elements being visible through said at least one aperture in said page.

10. In the teaching device of claim 1, said audio program further characterized as comprising a series of question words and a series of response words which follow said question words, said teaching device further comprising means for selectively interrupting said audio program to adapt said series of response words to correspond to a correct or incorrect response selected on said response means.

11. A teaching device comprising:
    a. means for reproducing first and second prerecorded signals, said first signal including an audio program comprising a plurality of different series of spoken words, said second signal including a plurality of different series of control signals, each series of control signals corresponding to a different series of spoken words, the control signals in each series of control signals being time coordinated with the spoken words in the series of spoken words corresponding thereto.

b. means responsive to said first signal for audibly reproducing said audio program;

c. a base having a predetermined page location thereon;

d. a plurality of individually actuatable visual signal elements at said page location;

e. a plurality of changeable pages each having a different series of written words thereon, the series of written words on each page corresponding to a different series of spoken words in said audio program, each of said pages being individually receivable on said base at said page location so that at least a portion of said visual signal elements are visible and located adjacent the written words on the page at said page location; and f. means responsive to said control signals for actuating the visual signal elements on said base so that the written words on the page received at said page location correspond to the spoken words in said audio program when the series of written words on the page received at said page location correspond to the series of spoken words in said audio program.

* * * * *